Patented Dec. 20, 1932

1,891,888

UNITED STATES PATENT OFFICE

JOHN J. GREBE, OF MIDLAND, MICHIGAN, ASSIGNOR TO THE DOW CHEMICAL COMPANY, OF MIDLAND, MICHIGAN, A CORPORATION OF MICHIGAN

RECOVERING BROMINE FROM SEA WATER AND THE LIKE

No Drawing.    Application filed December 18, 1930.  Serial No. 503,232.

This invention relates to methods for extracting or recovering bromine from saline solutions, such as sea water and the like, wherein such bromine is normally present in combined form in very small amount. All such methods depend, first, upon liberating the bromine in the elemental state by oxidizing the solution under proper conditions, such oxidation being effected either by electrolysis or by chemical means, the most convenient of which consists in treating with chlorine. After the preliminary liberation of free bromine in the solution it is then required to extract the same from the relatively large volume of water with which it is associated. The latter operation may be variously performed, and it is in this step that extraction processes differ most widely among themselves.

One method for extracting or separating the free bromine consists in precipitating the same in the form of an insoluble bromine compound which is filtered off. Such compound constitutes a concentrated bromine product which may be further processed to prepare any desired bromine product. It has been proposed in U. S. Patents 1,662,305 and 1,662,355 to separate the bromine in this way as the highly insoluble compound, tribromaniline. The general procedure, as described in the aforesaid patents, consists in acidifying the sea water, treating with chlorine to liberate bromine therein and then adding aniline or an aniline salt to precipitate the aforesaid tribromaniline. The formation of the latter compound, however, removes only one-half of the free bromine, while the remaining half is recombined as hydrogen bromide, according to the equation:—

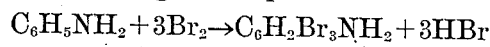

Such recombined bromine in the bromide must again be released by further treatment with chlorine. In practice it has been customary to add initially about twice the theoretical equivalent of chlorine, the excess thereof serving to liberate the soluble recombined bromine. This procedure is accompanied by certain disadvantages due apparently to the oxidation of aniline compounds by the excess chlorine, resulting in losses of aniline and bromine as well as in a discolored and impure tribromaniline product. To counteract such tendency to over-oxidation and to reduce the losses resulting therefrom, it has been found advisable either to increase the acidity of the solution in process or to conduct the treatment at temperatures below normal, or both, as described, for instance, in Ind. & Eng. Chem. 21:434–42. However, the cost of cooling the enormous volumes of water handled for even a moderately large bromine output is almost prohibitive for a commercial process, while the acid solution containing the excess of free chlorine above mentioned is strongly corrosive to usual metallic apparatus, thus necessitating the use of rubber-lined or other corrosion resistant apparatus pipes, etc. for holding and conveying the same.

I have now found that the above mentioned difficulties and disadvantages may be entirely avoided if the aniline is added to the suitably acidified sea water or equivalent bromide-containing solution before, instead of after, the bromine is liberated therein and the resulting solution chlorinated or otherwise oxidized under controlled conditions to exclude the presence of any material excess of oxidizing agent at all times. In this way the bromine is converted to tribromaniline pari passu with the liberation thereof, a highly pure tribromaniline product is obtained directly and in a form adapted to easy filtration, while due to the absence of a measurable concentration of free chlorine, losses due to over-oxidation are substantially eliminated. To the accomplishment of the foregoing and related objects, therefore, the invention consists in the procedure hereinafter fully described and particularly pointed out in the claims, the following description setting forth but a few of the various ways in which the principle of the invention may be used.

To proceed in accordance with the invention, the sea water or other bromide-containing solution is first acidified, if necessary, preferably with a mineral acid. The degree of acidification required in the case of sea water to enable a complete liberation of bromine in the subsequent oxidation step is that expressed by a pH value between 3 and 4, as described in a prior joint application of the present inventor, R. H. Boundy and L. C. Chamberlain, Serial No. 472,820, filed August 4, 1930. For average sea water which has not been previously treated to cause the decomposition of carbonates, this addition of acid amounts to about 100 to 150 parts per million of concentrated sulphuric acid, but more acid may be used, if desired. To the properly acidified solution aniline or a salt thereof, e. g. aniline sulphate or hydrochloride, is then added in approximately the proportion required to react with the total bromine present to form tribromaniline, i. e. in proportion of 93 parts (1 mole) aniline to 240 parts (1½ mole) bromine. The average bromine content of sea water being about 60 parts per million, the aniline requirement is about 23 parts per million of the water treated. The solution is then chlorinated directly to liberate bromine therein, a sufficient amount of chlorine being added to satisfy the equation:—

$$3HBr + 3Cl_2 + C_6H_5NH_2 \rightarrow C_6H_2Br_3NH_2 + 6HCl$$

The chlorine is introduced at such rate as to be combined almost immediately so that at no time is there an appreciable concentration of free chlorine in the solution. In this way the corrosion due to the action of a solution containing free chlorine is substantially avoided, so that all of the operations may be carried out in usual metallic apparatus. The bromine momentarily freed by the action of chlorine of course reacts with the aniline present as rapidly as it is liberated to form tribromaniline. The precipitated tribromaniline is separated by filtration, and is recovered directly in the form of fine white needle crystals having substantially the melting point of the pure compound, i. e. 119° C. The yield is between 60 and 70 per cent of the total bromine content of the sea water treated, losses being mainly accountable by the slight solubility of the compound which at the extreme dilutions involved amounts to an appreciable percentage of the total bromine.

The control of the chlorination may most conveniently be maintained by a potentiometric method which is described in the prior application of the present inventor and R. H. Boundy, Serial No. 472,027, filed July 31, 1930. Such method furnishes a constant indication of the oxidation potential of the solution in which bromine is being liberated in contact with bromide ions. The characteristic value of the oxidation potential of bromine in sea water or other solution to be processed may be previously determined by voltage measurement as described in the aforesaid application. In the case of sea water the minimum voltage at which free bromine exists in the solution is approximately 1.10 volt, referred to the standard hydrogen scale, at 18° C. As long as no measureable excess of chlorine is present in the solution wherein the bromine is being liberated, the observed potential will remain at or below the value corresponding to the potential of bromine in the particular solution employed, but as soon as there is an excess of chlorine a sharp increase in the observed potential indicates the fact immediately, thus enabling suitable control to be applied to the introduction of chlorine. It is thereby possible by simple means to regulate the introduction of chlorine continuously to avoid the presence of an excess thereof, and thus to exclude the occurrence of over-oxidation and its attendant difficulties and disadvantages.

The general procedure hereinbefore described is also applicable when the liberation of bromine is to be effected by electrolysis or by chemical oxidation methods other than the one more particularly shown, as will be readily apparent to those versed in the art.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method which comprises liberating bromine from a bromide-containing solution in the presence of aniline.

2. The method which comprises oxidizing a bromide-containing solution to liberate bromine therefrom in the presence of aniline.

3. The method which comprises chlorinating a bromide-containing solution to liberate bromine therefrom in the presence of aniline.

4. The method of recovering bromine from sea water and the like which comprises acidifying the same, adding aniline, oxidizing to liberate bromine in the presence of such aniline and separating the precipitated tribromaniline from the aqueous medium.

5. The method of recovering bromine from sea water and the like which comprises acidifying the same, adding aniline, chlorinating to liberate bromine in the presence of such analine and separating the precipitated tribromaniline from the aqueous medium.

6. The method of recovering bromine from sea water and the like which comprises acidifying the same to a pH value between 3 and 4, adding aniline in substantially the amount theoretically required to form tribromaniline from the bromine content thereof, then adding chlorine sufficient to liberate all of the combined bromine present and separating the precipitated tribromaniline from the aqueous solution.

Signed by me this 13 day of December, 1930.

JOHN J. GREBE.